LINE PULSE KEYED AUTOMATIC GAIN CONTROL CIRCUIT WITH CONTROL VOLTAGE DELAY

Filed Aug. 1, 1949

3 Sheets-Sheet 1

INVENTOR.
HARLAND A. BASS
BY
Alden D. Redfield
Charles Marshall Hogan
ATTORNEYS

July 3, 1951 H. A. BASS 2,559,038

LINE PULSE KEYED AUTOMATIC GAIN CONTROL CIRCUIT WITH CONTROL VOLTAGE DELAY

Filed Aug. 1, 1949 3 Sheets-Sheet 2

INVENTOR.
HARLAND A. BASS
BY Alden D. Redfield
Charles Marshall Hogan
ATTORNEYS

July 3, 1951 H. A. BASS 2,559,038

LINE PULSE KEYED AUTOMATIC GAIN CONTROL CIRCUIT WITH CONTROL VOLTAGE DELAY

Filed Aug. 1, 1949 3 Sheets-Sheet 3

INVENTOR.
HARLAND A. BASS
BY
Alden D. Redfield
Charles Marshall Hogan
ATTORNEYS

Patented July 3, 1951 2,559,038

UNITED STATES PATENT OFFICE 2,559,038

LINE PULSE KEYED AUTOMATIC GAIN CONTROL CIRCUIT WITH CONTROL VOLTAGE DELAY

Harland A. Bass, Mount Healthy, Ohio, assignor to Avco Manufacturing Corporation, Cincinnati, Ohio, a corporation of Delaware Application August 1, 1949, Serial No. 107,962

1 Claim. (Cl. 178—7.3)

Figure 1:
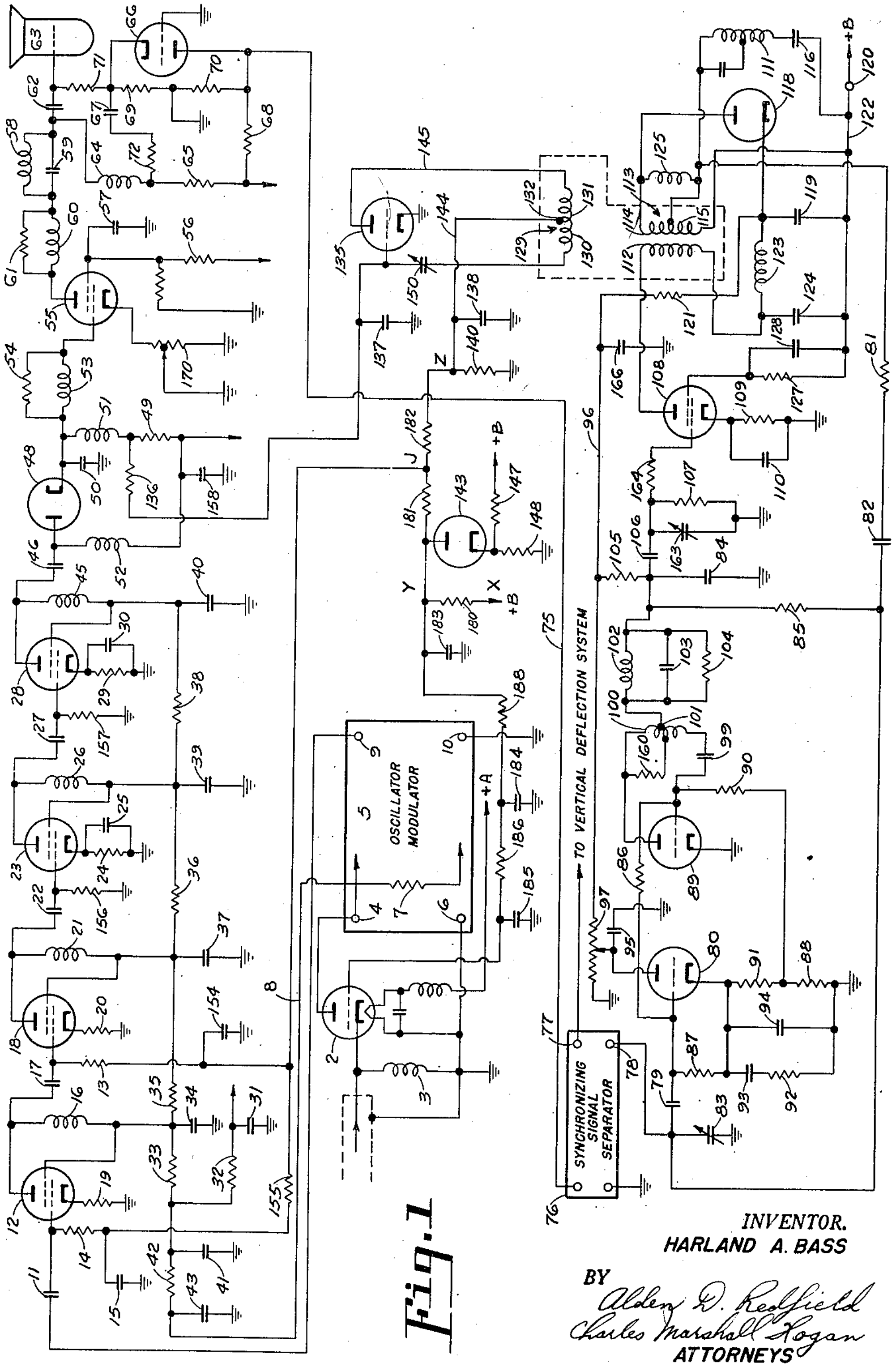

The present invention is a novel automatic gain control (A. G. C.) circuit for television receivers, specifically a gain control circuit which is adapted to apply control potentials both to the radio frequency (R. F.) input stage and to one or more intermediate frequency (I. F.) stages in such a manner that such control potential is first applied to the I. F. stages as the video signal level increases and later to the R. F. input stage.

A number of automatic gain control circuits have been developed, and research in this field is very active. It has been directed to the finding of an efficient gain control circuit with good brightness, stability, freedom from flicker normally caused by line voltage fluctuations, a high degree of immunity from noise interference and easy adaptability for use in conventional television receivers, with a minimum loss in gain and band width and a minimum cost. The present invention, while directed generally to those objectives, is addressed specifically to the objective of automatically providing a diversity or delay between the gain control potentials applied to the radio frequency input stage and the controlled I. F. stages, in such a manner as to assure a reconciliation of the conflicting requirements of desired high signal-to-noise ratio and maximum sensitivity and the avoidance of undesired overload with strong signals. In other words, the circuit in accordance with the present invention is so arranged that a portion of the available control potential is applied only to the I. F. stages at low signal input level, and that full control potential is applied to both I. F. and R. F. stages at high signal input levels.

If any application of A. G. C. potentials to both R. F. and I. F. stages is delayed until a good signal-to-noise ratio is attained, an overload condition can occur in the I. F. amplifier stages. On the other hand, if control potential is applied to the I. F. stages without any delay, then there is a sacrifice of sensitivity.

It is an object of the present invention to reconcile the conflicting requirements for an ideal A. G. C. system by providing an arrangement which performs these functions:

(1) It delays the application of full control potential to either I. F. or R. F. stages until the output of the video detector has reached an adequate level;

(2) It delays the application of any gain control potential to the R. F. stage until the carrier input level is such as to insure a satisfactory signal-to-noise ratio at the input of the I. F. amplifier;

(3) It applies partial control potential to the I. F. stages at low signal input level before any A. G. C. potential is applied to the R. F. stage, to insure that no overload develops on strong signals.

For a better understanding of the present invention, together with further objects, advantages, and capabilities thereof, reference is made to the following description of the accompanying drawings, in which there is illustrated a preferred illustrative form of A. G. C. system in accordance with the invention, as embodied in a television receiver.

Figure 2:
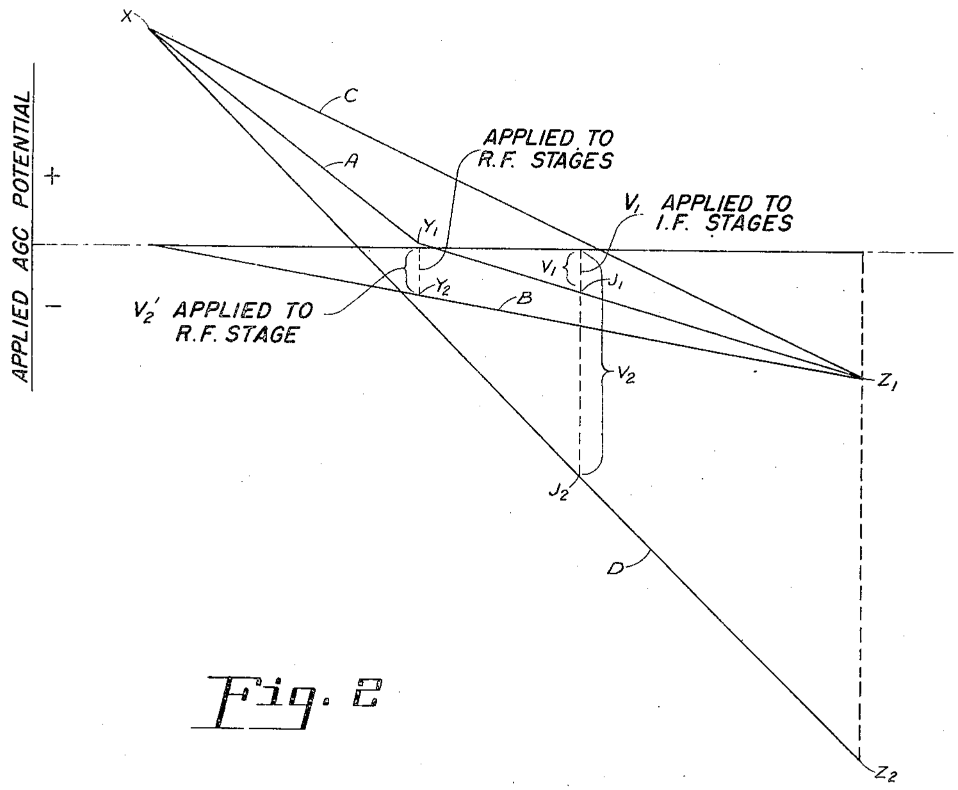
Figure 3:
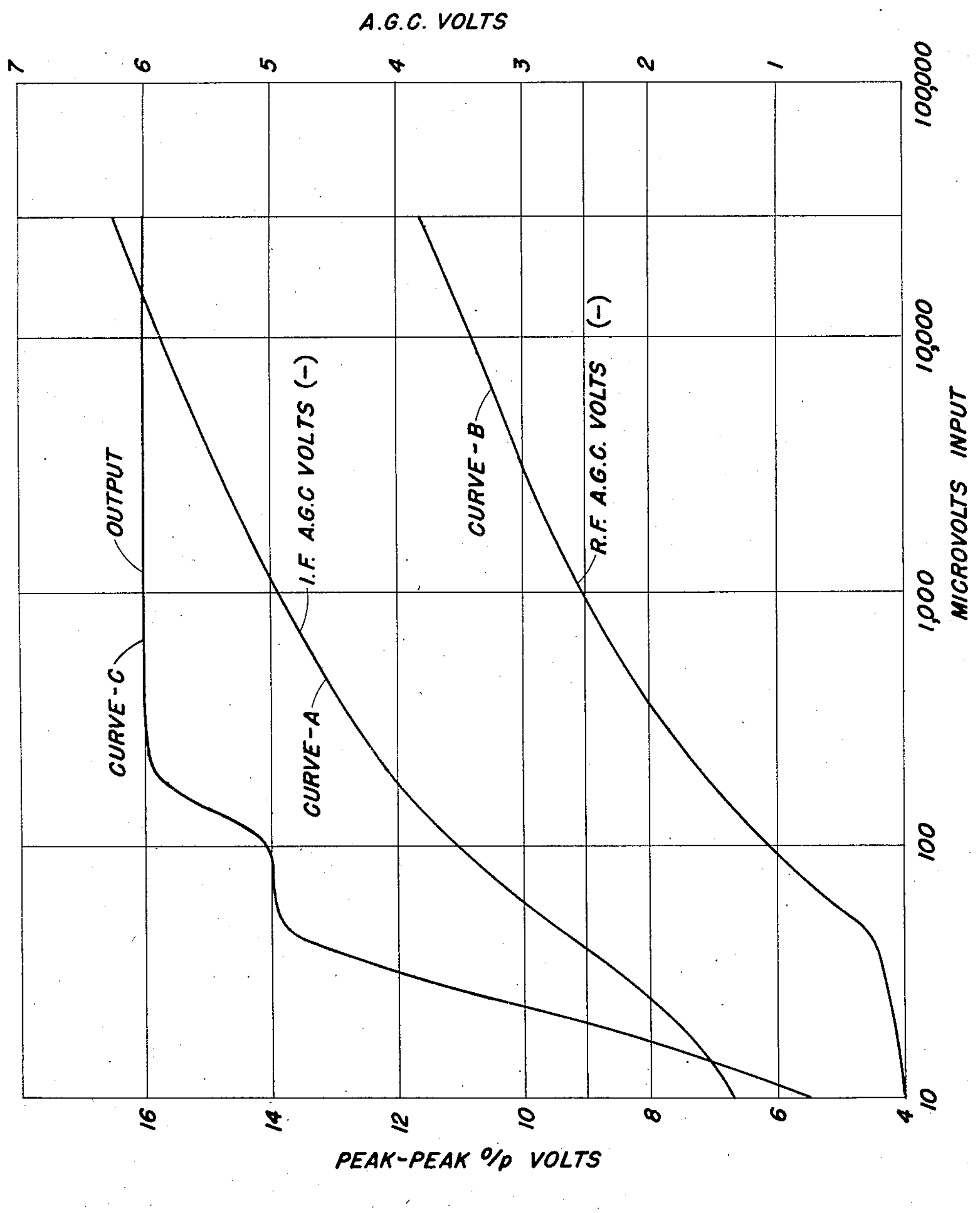

Fig. 1 of the drawings is a circuit diagram, partly in block form, of a television receiver including my novel A. G. C. circuit; Fig. 2 is a set of graphs used as an aid in describing the operation of the invention; and Fig. 3 is a set of performance curves showing how the developed A. G. C. potentials at the I. F. and R. F. stages vary with signal input to the antenna circuit.

In accordance with a narrow aspect of the invention, there is provided an automatic gain control system, for use with a television receiver of the type including a gain-controlled video channel having radio frequency and intermediate frequency stages, a video detector and a line-frequency deflection system providing a source of line-frequency pulses. This system comprises the combination of means 135, etc. keyed by the line-frequency signal output of said detector 48, etc. for providing a source of negative potential having an amplitude which varies in accordance with the detector output, a source of positive potential +B, a resistor 180, 181, 182 connected between said potential sources, a diode 143 coupled between a point Y on said resistor and ground and having its anode connected to said resistor for holding said point Y substantially at ground potential until the output of said detector reaches such a level that said point Y goes negative, means 183, 188, 184, 186, 185 for coupling said point to said radio frequency stage 2, etc. to apply an A. G. C. potential thereto, and means 154, 13, etc. for coupling another point J on said resistor to said intermediate frequency stage to apply an A. G. C. potential thereto, said other point J being located between the first-mentioned point Y and the source of negative potential, whereby a portion of the available negative A. G. C. potential is first applied to the I. F. stages alone, and, after an increase in carrier signal level, A. G. C. potentials not affected by said diode are applied to both R. F. and I. F. stages.

In accordance with a broad aspect of the invention, there are provided, in combination, a source of increasing negative voltage 138, 140, 135, etc., a resistor 180, 181, 182 having one terminal connected to said source, means for maintaining a point Y on said resistor at ground potential until the negative voltage output of said source attains a predetermined value, said means comprising a source of positive potential +B connected to the other terminal of said resistor and a rectifier 143 connected between said point Y and ground, whereby other points (such as J) on said resistance between said point and said negative source swing increasingly negative relative to the first-mentioned point as said negative voltage increases and whereby said point Y finally swings negative as said negative voltage becomes sufficiently great, whereupon said rectifier becomes non-conductive and at least one point (between X and Y) on said resistor between said rectifier and said positive voltage source swings negative.

The specific description begins with a brief explanation of a typical channel which is controlled by the automatic gain control circuit in accordance with the invention. In the present illustrative disclosure, the novel automatic gain control circuit is shown as incorporated in a superheterodyne television receiver of the intercarrier sound type. This receiver includes the usual antenna, a cathode input radio frequency stage including a triode 2, having an inductor 3 between its cathode and ground. The anode of tube 2 is connected to a terminal 4, one of the input terminals of an oscillator modulator stage 5, the latter being shown in block form. The other input terminal 6 of the oscillator modulator stage is connected to the cathode of tube 2. Included within the block 5 is an anode resistor 7 which is connected through line 8 to a plate supply filter network 41, 42, 43. The oscillator modulator stage also includes a pair of output terminals 9 and 10 which are coupled to the input of the first intermediate frequency stage.

The remaining circuit elements within the oscillator modulator stage indicated by the block 5 are not shown in detail. A Mallory inductuner may be employed in lieu of the elements designated 2, 3, 4, 5, 6, 7, 8, 9, and 10, such tuner being well-known to those skilled in the art and fully described in the following publications: Photofact Television Course, 1949, Howard W. Sams & Co., Inc., Indianapolis 7, Indiana—particularly pages 151 and 152; Crosley Television Information Bulletin No. 368, copyright 1948, Crosley Division, Avco Manufacturing Corporation, Cincinnati 25, Ohio; also Crosley Service Information Bulletins Nos. 385, 376, and 380.

The intermediate frequency video carrier signals in this receiver are applied through a coupling capacitor 11 to the input circuit of an I. F. amplifier tube 12, the grid of this tube being returned to an automatic gain control line through a resistor 14, the cathode of this tube being connected to a biasing resistor 19. This first I. F. stage is coupled, as by an inductor 16 and a capacitor 17, to the input circuit of a second I. F. stage including an electron tube 18, which is similarly provided with a grid resistor 13 and a cathode impedance 20 and is coupled to the input of a third I. F. stage as by an inductor 21 and a capacitor 22. The third I. F. stage comprises an electron tube 23, the cathode of which is biased by a resistor 24, by-passed by a capacitor 25. This stage is similarly coupled, as by an inductor 26 and a capacitor 27, to the input of a fourth and final I. F. stage consisting of an electron tube 28, the cathode of which is connected to a biasing resistor 29, by-passed by a capacitor 30. Plate and screen potentials for these tubes are furnished from a source of space current (not shown) coupled to a filter network comprising series resistors and shunt capacitors designated by the reference numerals 31, 32, 33, 34, 35, 36, 37, 38, 39, and 40. The filter section indicated by the reference numerals 41, 42, and 43 provides anode potentials for the R. F. input and the oscillator-modulator stages.

The final I. F. stage is coupled, as by an inductor 45, a capacitor 46, and an inductor 52, to a conventional detector network comprising a diode 48 and other circuit elements, the purpose of which is to produce a flat video response characteristic throughout a wide range of frequencies up to more than four megacycles. Specifically, this detector includes a network consisting of a load resistor 49, a capacitor 50, shunt peaking inductor 51 and series peaking inductor 53, the latter being shunted by a damping resistor 54 and connected to the grid of a single tube 55 included in a video frequency amplifying stage. A variable cathode bias is provided for contrast control purposes, degeneration being adjusted as desired. The screen is by-passed by a capacitor 57, and the anode output is taken off through a type of "constant K" peaking circuit, comprising a parallel combination of an inductor 60 and a damping resistor 61, a resonant circuit, comprising a parallel combination of inductor 58 and capacitor 59, an inductor 64 and a resistor 65, and a coupling capacitor 62 connected to the grid of a cathode ray picture tube 63. The anode of the video amplifier has a load comprising a series combination of an inductor 64 and a resistor 65, leading to a source of space current not shown. The direct current reinserting circuit comprises a grounded-grid triode 66 having its cathode coupled to the lower end of coil 64 through a capacitor 67 and a resistor 72 and having its plate connected to the lower end of resistor 65 through a resistor 68. The cathode-anode circuit of triode 66 is shunted by a series combination of resistors 69 and 70. As is well-known to those skilled in the art, a direct current component which is a measure of the over-all illumination appears at the cathode of tube 66 and is applied to the grid of the picture tube through a resistor 71. D. C. restorer networks of this general character are shown and described in a number of publications, including U. S. Patent No. 2,240,281, issued to R. C. Ballard on April 29, 1941.

In the foregoing description, and in fact throughout this disclosure, wave traps, filters, iron cores, suppressor grids, and other elements which need not be shown in order to illustrate or to disclose or describe the present invention or an appropriate background for the invention are omitted for purposes of simplicity and clarity, so far as possible. For the same purposes, pentodes are shown in places as triodes.

The above-described elements which begin with the reference numeral 3 and end with the reference numeral 72 collectively show the channel which is controlled and the significant element of that channel between the tuner and the picture tube. In brief, these elements show that which is controlled by the A. G. C. system in accordance with the invention. It will be understood that the invention is not confined to this specific type of controlled channel but may be utilized in any television receiver environment wherein A. G. C. is desired.

This automatic gain control is of the keyed type, and the description now proceeds to a discussion of the arrangement by which the keying pulses are developed.

The horizontal and vertical synchronizing pulses are applied, as by a conductor 75, from the anode of the grounded grid D. C. restorer and sync separator stage to a conventional synchronizing signal separator 76, herein shown in block form, this unit performing the usual function of separating the vertical pulses from the horizontal pulses. A terminal 77 of the separator network 76 is connected to the vertical deflection system, which need not be shown herein for purposes of describing the present invention.

The illustrative horizontal system herein shown comprises a blocking oscillator with automatic pulse width control. The horizontal synchronizing pulses are applied with positive polarity from terminal 78 of the synchronizing signal separator through a coupling capacitor 79 to the grid of a triode 80. High voltage negative pulses obtained from the horizontal deflection system are partially integrated and attenuated by a network comprising series resistor 81, series capacitor 82, and variable shunt capacitor 83, and are also applied to the grid of tube 80. Pulses of a third wave shape are obtained from the discharge capacitor 84 and integrated by a network comprising series resistor 85 and shunt capacitor 83 to form parabolic wave shapes. Tube 80 is the control tube and is biased near cut-off by the D. C. component of the blocking oscillator grid voltage applied through resistors 86 and 87. The plate current of tube 80 consists essentially of pulses the width of which is determined by the relative phases of the synchronizing pulses from terminal 78 and the parabolic pulses formed by the network 83, 85. The voltage developed across a resistor 88 by this average plate current is injected from the cathode circuit of tube 80 into the grid of the blocking oscillator triode 89 by way of a resistor 90, in order to maintain the phase relationship between the oscillator output and the synchronizing signals. The cathode circuit of tube 89 is an integrating network comprising resistors 88, 91, and 92 and capacitors 93 and 94. The cathode circuit integrating network has a fast response, in that capacitor 94 is relatively small, and a slow response, in that resistors 91 and 88 are relatively large. The fast time-constant network tends to prevent "hunting," while the slow time-constant network filters out disturbances of greater duration.

The plate of the control tube is by-passed by a capacitor 95 and connected to the anode voltage line 96 through a potentiometer 97.

The automatic pulse width control circuit is fully described in the article entitled "Automatic Frequency Phase Control of Television Sweep Circuits," Proceedings of the I. R. E., 1949, pages 497 et seq., volume 37, No. 5, published by the Institute of Radio Engineers, New York, May 1949, and also at page 84 of the above-mentioned Photofact Television Course publication. Reference is made to these publications for a complete description of the automatic pulse width control circuit.

The plate current flow of tube 80, passing through the cathode resistor 88, controls the grid circuit time constant of the blocking oscillator tube 89 to produce synchronization, this resistor 88 being common to the grid circuit of blocking oscillator tube 89 and the time-constant circuit comprising capacitor 99, resistor 90, and resistor 88.

The blocking oscillator circuit comprises a triode 89, an auto-transformer or inductor 100 arranged in a series combination with capacitor 99 coupled between plate and grid, and a discharge capacitor 84 effectively coupled between a tap 101 on the auto-transformer and ground. A resonant circuit comprising a parallel combination of an inductor 102, a capacitor 103, and a damping resistor 104 is interposed between this tap and the high potential terminal of capacitor 84. Plate voltage is supplied to the blocking oscillator through a circuit comprising lead 96, dropping resistor 105, inductor 102, tap 101, and a part of auto-transformer 100. The sawtooth voltages employed for horizontal deflection are developed across discharge capacitor 84, tube 89 functioning not only as a blocking oscillator tube but also as a discharge tube, as described in the afore-mentioned article in the May 1949 issue of Proceedings of the I. R. E.

The discharge capacitor is coupled, as by a capacitor 106 and a grid resistor 107, to the grid of a horizontal output amplifier tube 108, the latter being provided with a cathode resistor 109 by-passed by a capacitor 110. The output of this amplifier stage is coupled by a tranformer network 112–115 to the deflecting coils 111 and the current waves appearing in the plate circuit of this amplifier tube are employed to produce periodically recurring sawtooth currents of line frequency in coils 111, thereby to deflect the electronic beam in the picture tube at line frequency.

The system intercoupling the horizontal output tube and the deflection yoke will be understood by reference to the following patents and publications: Kiver, Television Simplifier, pages 207–213, second edition, 1948, D. Van Nostrand, Inc., New York; U. S. Patent No. 2,440,418, Tourshou. Reference to those publications is made for a detailed description of this network. Briefly, however, the primary 112 of the horizontal output transformer is coupled to a secondary 113 comprising series portions 114 and 115, of which portion 115 is coupled across the yoke circuit 111, 116. It will be understood that the coils 111 form part of a yoke assembly encircling the neck of the cathode ray image reproducing tube 63.

The voltage variations applied to the control electrode of power tube 108 produce a rising current in tube 108 during scansion, which current is cut off at the beginning of retrace time. The current in the deflection coils 111 and the horizontal output transformer does not disappear at the instant of cut-off of tube 108, however, due to the inherent distributed capacity of the circuit. The inductance of these coils and the transformer, together with the above-mentioned distributed capacity, forms a tuned circuit in which high frequency oscillations would normally be produced. These oscillations begin with the start of retrace time and continue for one-half of the normal period of oscillation, the oscillation being stopped at the negative current peak by a series combination of a diode 118 and a capacitor 119 connected across the secondary 113. The polarities immediately following retrace are such that damper tube 118 conducts and continues to conduct until tube 108 again becomes conductive. The voltage developed across capacitor 119 is such as to increase or boost the voltage of the D. C. power source (not shown) connected to terminal 120. It will be noted that anode potential line 96 is connected to this terminal through a series circuit comprising resistor 121, capacitor 119, and line 122, to supply anode potential to tubes 80 and 89.

The plate of tube 108 is connected to terminal 120 through primary 112, inductor 123, capacitor 119, and lead 122, to supply anode potential to tube 108.

The primary winding 112 of the horizontal output transformer is connected to a capacitor 124 in such a manner that a varying voltage is developed across capacitor 124, which voltage is applied to capacitor 119 through an inductor 123, for purposes of linearity control.

For purposes of width control, there is connected in shunt with portion 114 of secondary 113 an inductor 125. The operation of the width-control is well-known to those skilled in the art and is considered in such publications as U. S. Patent 2,449,969 to Antony Wright.

The horizontal output transformer also includes a winding 129 having two portions, 130 and 131, and a tap 132, the winding 129 being inductively coupled to the primary and secondary windings.

The elements beginning with the reference numeral 75 and ending with the reference numeral 132 are herein shown for the purpose of disclosing an illustrative source of keying pulses employed in the automatic gain control system in accordance with the invention. It will be understood that the keying pulse source collectively designated by the reference numerals beginning with 75 and ending with 132 is illustrative and that other arrangements for deriving keying pulses from the horizontal deflecting system may be employed.

Having described the channel which is controlled and the circuit arrangements which function as a source of keying pulses for the automatic gain control system in accordance with the present invention, the description now proceeds to the latter.

The source of negative potential employed in the automatic gain control circuit in accordance with the invention comprises a keyed pulse rectifier tube 135. This tube is periodically rendered conductive, at line-frequency rate, by pulses derived from the horizontal deflection system. Specifically, there is inductively coupled to the horizontal output transformer windings 112 and 113 a third winding 129, which comprises portions 130 and 131, having a tap 132 therebetween. Portion 131 is included in the anode circuit of tube 135, which may be traced from the anode through conductor 145, winding 131, tap 132, and conductor 144, to a time constant network comprising a parallel combination of a resistor 140 and a capacitor 138, connected between conductor 144 and ground. The line-frequency pulses which are developed across winding 131 during retrace intervals are of such a polarity as to render tube 135 conductive, and this tube plate-rectifies into the time-constant network 138, 140. The elements 135, 138, 140 are comprised in the means for developing a negative potential which varies with detector output level.

The degree of conductivity of tube 135, assuming constancy of the pulses applied to its plate, is a function of the magnitude of the control pulses which are applied to the grid of tube 135. These control pulses in turn have an amplitude which is a function of the magnitude of the derived synchronizing signal components of the video signal output of the detector. The control pulses are taken from the detector and are coupled galvanically to the grid of tube 135 by the network comprising resistor 48, resistor 136, and capacitor 137. Resistor 136 isolates capacitor 137 from the video channel, including the elements 53, 54. It will be noted that the grid of tube 135 is D. C. coupled to the detector, so that the D. C. component of the video signal is not lost. Resistor 136 and capacitor 137 provide a filter which cuts off at approximately 150 kilocycles, thereby discriminating against noise and interference. It is desirable that the filter comprising the elements 136 and 137 have a cutoff characteristic such that the synchronizing pulse components derived by the video detector and appearing at the output thereof are applied with substantially full amplitude to the input of tube 135, although distortion as to the wave forms of these pulses is desired. In other words, the network 136, 137 should discriminate against high frequency noise and in doing so will somewhat distort the wave shapes. The object of the filter 136, 137 is to apply these pulses to the grid of tube 135 with the optimum signal-to-noise ratio. The fundamental of these pulses being on the order of 15,000 cycles, a filter having high frequency cutoff characteristics of 150 kilocycles has been found entirely satisfactory. The output of such a filter contains the necessary information concerning the peak height of the synchronizing signals. Any increase in band width over that required to indicate such height would reduce the discrimination against noise and serve no useful purpose. As pointed out in the copending patent application of Francis A. Wissel and Norman W. Parker, Serial No. 102,176, filed in the United States Patent Office on June 30, 1949, and assigned to the same assignee as the present application and invention, resistor 136 also provides grid circuit clipping of large impulse noise pulses of positive polarity. This series grid resistor 136 is very large compared to the grid-to-cathode resistance of tube 135 when grid current flows so that the input signal to tube 135 is limited to the voltage level of the grounded cathode. When noise pulses tend to cause the grid of tube 135 to become positive with respect to the cathode, the grid-to-cathode resistance drops to a negligible value with respect to resistor 136 and the grid current flow in resistor 136 develops a bias which opposes the positive noise pulses.

The input admittance of tube 135 is neutralized by a variable capacitor 150 which couples the plate and grid circuits of tube 135 in such a way that the current passing through it is of proper amplitude and phase to neutralize the effect of the current flowing between the plate and grid circuits of tube 135 via the grid-plate capacitance. The voltage at the end of winding portion 130, connected to capacitor 150, is in phase opposition to the voltage at the end of winding portion 131 connected to the plate of tube 135.

The voltage across the neutralizing inductance 130 causes the grid of tube 135, connected to capacitor 150, to receive a current which neutralizes energy transfer through the tube capacitance as explained in Terman, Radio Engineering, pages 367 et seq., Third Edition, 1947, McGraw-Hill Book Co., Inc., New York, New York.

Capacitor 137 also aids in minimizing the critical character of the neutralization.

As stated above, the control pulses are applied to the input circuit of tube 135 to develop an amplified A. G. C. potential. This is accomplished by plate rectification of the line-frequency pulses of positive polarity, applied to the plate circuit of tube 135. These pulses are developed during retrace intervals, in winding 131, so included in the horizontal output transformer.

Tube 135 is periodically keyed into conductivity to develop, by plate-rectification, across the time-constant network 138, 140 an amplified A. G. C. potential. The pulses applied to the anode of tube 135 being constant, its plate current pulses, of negative polarity, are a function of the amplitude of the grid voltage peaks, which in turn are a function of the line-frequency synchronizing signal amplitude, the latter being a function of video signal output level at the detector. As indicated in the above-mentioned copending Wissel and Parker patent application, this type of A. G. C. system is particularly insensitive to noise in that the amplified A. G. C. potential is developed during phase coincidence of the pulses applied to grid and plate of tube 135, which pulses occupy but a very small total time as compared to the duration of one line, for example. During the remaining major time portions, the system is entirely immune from noise interference.

Referring now to the time constant network 138, 140, it should possess the following desirable characteristics:

Resistor 140 has a value many times that of the plate resistance of tube 135 in order to provide good gain; capacitor 138 has a value which gives a compromise between two requirements, namely: (1) The capacitor should be large enough to insure high output voltage from the rectifier 135, and (2) the capacitor should be small enough to provide a fast time constant so that the negative voltage at point Z will be adjusted in value every few lines, which will insure a maximum immunity to noise.

The automatic gain control circuit in accordance with the invention comprises the following principal components:

First, a source of negative potential having an amplitude which increases in accordance with the video output level of detector 48;

Second, a source of positive potential;

Third, a resistor network to one end of which the positive potential is applied and to the other end of which the negative potential is applied, whereby the ground-potential point on said network is shifted toward the first-mentioned end as the video output level increases, and whereby distinct A. G. C. potentials are developed at spaced points on said network;

Fourth, first and second coupling and filter networks independently connected between said spaced points and the I. F. and R. F. controlled stages, respectively; and Fifth, a clamping diode which maintains substantially at ground potential that point to which the first coupling network is connected, until said diode becomes nonconductive, at which time said point goes negative.

The fixed source of positive potential need not be shown in detail. Its positive is indicated by the symbol +B, at one terminal of resistor 180.

The inventive combination comprises a resistor network 180, 181, 182, arranged in series. The positive source is connected to resistor 180 at point X. The negative source is connected to resistor 182 at point Z. Since one end (X) of this network 180, 181, 182 is initially positive, and the other end Z is initially negative, there would be a ground-potential point in the network to the right of Y if for the moment the operation of diode 143 be neglected. This point would be shifted away from Z and toward X as the video output level at the detector increases.

A. G. C. potential is applied to the control electrode of the R. F. input tube 2 by a second coupling or filter network comprising a shunt capacitor 183, a series resistor 188, a shunt capacitor 184, a series resistor 186 and a shunt capacitor 185, connected between point Y and that control electrode.

A. G. C. potential is applied to the control electrodes of the I. F. amplifier tubes 12 and 18 by a first coupling network. The junction of resistors 181, 182 is connected to the grid resistor 13 of tube 18, a shunt filter capacitor 154 being provided. That junction is also connected to the grid resistor 14 of the tube 12, through a filter comprising a series resistor 155 and a shunt capacitor 15.

The first amplified A. G. C. potential appearing at point J, the junction of resistors 181 and 182, is applied to the I. F. stages. The second amplified A. G. C. potential, appearing at point Y, the junction of resistor 180 and the anode of diode 143, is applied to the R. F. stage. Curves A, B, and C of Fig. 3 show A. G. C. potential applied to I. F. stages, A. G. C. potential applied to R. F. stages and detector output level, respectively, as ordinates, plotted against input signals as abscissae. It will be noted that a portion of the available A. G. C. potential is first applied to the I. F. stages and that, as input signal level increases, more potential is applied to the I. F. stages until the input level becomes such that A. G. C. potential is applied at a slow rate of increase to the R. F. stage. Finally full A. G. C. potential is applied at substantially the same rate of increase to both stages.

As stated above, as the video detector output increases, the assumed ground-potential point in network 181, 182 tends to be shifted to the left. Initially, when the output level is such that tube 135 becomes conductive, the assumed ground potential point is located between points Y and J, so that a portion of the available negative A. G. C. potential is applied to the I. F. stages as soon as tube 135 becomes conductive. This potential becomes increasingly negative as the output level increases.

Point Y is to the left of the assumed ground potential point and would be at a substantial positive potential at the initiation of the application of A. G. C. potential to the I. F. stages, were it not for the action of diode 143. This diode and its cathode resistor 148 are connected between point Y and ground.

The diode is provided with a cathode resistor 148, the high potential side of which is connected through a resistor 147 to the positive terminal of a source of potential (not shown), the purpose of which is to cause to flow in resistor 148 a current of positive polarity and a voltage drop of such magnitude as to overcome the contact potential of the diode 143. The term "contact potential" is well-known to those skilled in the art and this phenomenon is discussed at pages 8 and 9 of Reich's Theory and Applications of Electron Tubes, second edition, 1944, McGraw-Hill Book Co., Inc., New York, New York. The provision being made for overcoming contact potential, the following discussion will be postulated on the assumption that the cathode of diode 143 is at ground potential.

The diode is conductive, so long as the resultant of the opposed voltages from source +B and network 140, 138 is such that the anode of the diode is positive; i. e., until the video detector output level is such that the ground-potential point in network 180, 181, 182 is shifted to the left of point Y and on to resistor 180. The diode therefore holds point Y at substantially ground potential until the ground potential point that would be produced by the action of the above-mentioned two opposed voltages is shifted to the left of point Y. When the video output level becomes sufficiently great to render the diode nonconductive, point Y then goes negative and A. G. C. potential is applied to R. F. tube 2. It will be noted that the source +B, the network 180, 181, 182, diode 143 and the negative source 135, 140, 138, automatically accomplish the required delay between the initial applications of A. G. C. potential to the R. F. and I. F. stages.

Referring now specifically to Fig. 2 for aid in describing the operation of the invention, in accordance with another approach in exposition, the potentials of points X, Y, J, and Z are illustrated by corresponding symbols. Let it be assumed that the carrier signal level is increasing. Point X is always positive and is maintained so by a source of positive potential, +B. Point Z is at a negative potential as represented by the symbol $Z_1$. Curve C of Fig. 2 illustrates what the voltage conditions would be at points X, Y, and Z if it were not for the action of diode 143. Were it not for that diode, point Y would be at a positive potential with respect to ground. It will be obvious from an inspection of curve C that, as the video detector output level increases, the point at which curve C intercepts the ground potential line will continue to shift to the left. This point is the "assumed ground potential point" mentioned above. The curve A illustrates the effect of the diode action in clamping point Y substantially at ground potential. From an inspection of curve A, it will be seen that as soon as tube 135 becomes conductive point Z is at a negative potential, as illustrated by $Z_1$, and A. G. C. voltage $V_1$ is applied to the intermediate frequency stages, the potential at point J being indicated by $J_1$. Under these conditions point Y is substantially at ground potential, as indicated by the symbol $Y_1$, and no A. G. C. voltage is applied to the R. F. stage.

Curve B illustrates the events which would occur in the absence of the source of positive potential connected to point X. If X (the terminal of resistor 180 remote from point Y) were at ground potential, A. G. C. potentials, as indicated by curve B, would simultaneously begin to be applied at the same rate of increase to the R. F. and I. F. stages. However, the action of the diode is such, as indicated by curve A, that a portion of the available A. G. C. potential is applied to the R. F. stage.

Curve D shows the events which occur as the output signal level increases. A potential $V_2$ is now developed at point J, indicated by the symbol $J_2$, so that a larger A. G. C. potential is now applied to the intermediate frequency stages. The point at which curve D intersects the ground potential line has shifted to the left of the clamping diode, so that a negative A. G. C. potential $V_2'$ is now applied to the R. F. stage. Thus it will be seen that the positive voltage source causes the application of A. G. C. potential to the R. F. stage to be delayed. It will also be seen that the action of the clamping diode is such as to prevent A. G. C. potential from being applied to the R. F. stage until the I. F. stages have attained a relatively high signal level.

It would be possible to place point X at ground potential and to swing points Y and J negative at the same rate. This condition is represented by curve B. Such an arrangement would not accomplish the objects of this invention, which requires this sequence of events: partial application of A. G. C. potential to the I. F. stages, delayed application of A. G. C. potential to the R. F. stage, finally increasing A. G. C. potential to both I. F. and R. F. stages. Curve B shows that these objects require the use of means to prevent point Y from going below ground potential until the desired delay is accomplished.

The required delay is produced by the positive source. It would be possible, as shown by curve C, to omit the diode. But the tolerances prevailing in television receiver manufacturing practice would occasion so much fortuitous shifting of the ground point that adjustment would be impracticable. Therefore the combination of the positive source and the diode is used to clamp point Y at ground potential so that the negative swing is first about point Y and finally about point X as a reference when signal level increases.

It will be noted that tube 135 plate-rectifies into network 140, 138, shunted by the series load of resistors 181, 182 and diode 143. When diode 143 become nonconductive, the load impedance in the plate circuit of the tube 135 suddenly increases, due to the effective removal of the shunt. This factor tends further to increase the A. G. C. potential applied to the I. F. stages as the application of gain control potential to R. F. stage is initiated.

Curve A represents the potential levels in network 180, 181, 182, at points from X to Y, under a low input signal level condition. Curve B represents the potential levels under a high input signal condition. These curves are drawn for purposes of illustration and are not proportioned to the resistance values, illustrative parameters being given in the following paragraph.

The following circuit parameters have been found entirely satisfactory in one illustrative embodiment of the invention:

| | |
|---|---|
| Capacitor 11 | 100 mmf. |
| Capacitor 15 | 0.01 mfd. |
| Resistor 14 | 10,000 ohms |
| Resistor 13 | 8200 ohms |
| Resistor 20 | 68 ohms |
| Tubes 12, 18, 23 | Type 6AU6 |
| Capacitors 17, 22, 27 | 100 mmf. |
| Resistor 24 | 68 ohms |
| Capacitor 25 | 5000 mmf. |
| Resistor 156 | 5600 ohms |
| Resistor 157 | 10,000 ohms |
| Resistor 29 | 100 ohms |
| Capacitor 30 | 5000 mmf. |
| Capacitor 40 | 5000 mmf. |
| Resistors 38, 32, 36, 35, 33 | 100 ohms |
| Capacitors 39, 37, 34, 31 | 500 mmf. |
| Capacitor 46 | 100 mmf. |
| Tube 28 | Type 6AG5 |
| Tube 48 | Type 6AL5 |
| Resistor 49 | 5600 ohms |
| Capacitor 158 | 5000 mmf. |
| Capacitor 50 | 5 mmf. |
| Capacitor 54 | 22,000 ohms |
| Tube 55 | Type 6AG5 |
| Resistor 56 | 39,000 ohms |
| Resistor 61 | 22,000 ohms |
| Capacitor 57 | 4 mfd. |
| Capacitor 62 | 0.05 mfd. |

| | |
|---|---|
| Resistor 72 | 3300 ohms |
| Capacitor 67 | 0.1 mfd. |
| Resistor 65 | 4700 ohms |
| Resistor 68 | 820,000 ohms |
| Resistor 69 | 270,000 ohms |
| Resistor 70 | 47,000 ohms |
| Tube 63 | Type 10BP4 |
| Capacitor 83 | 30–240 mmf. |
| Capacitor 79 | 0.002 mfd. |
| Resistor 87 | 820,000 ohms |
| Capacitor 93 | 0.25 mfd. |
| Resistor 92 | 8200 ohms |
| Capacitor 94 | 0.02 mfd. |
| Resistor 91 | 150,000 ohms |
| Resistor 88 | 150,000 ohms |
| Tube sections 80, 89 | Type 6SN7GT |
| Resistor 87 | 2.7 megohms |
| Capacitor 95 | 0.05 mfd. |
| Resistor 97 | 268,000 ohms, variable |
| Resistor 90 | 100,000 ohms |
| Resistor 160 | 10,000 ohms |
| Capacitor 99 | 200 mmf. |
| Capacitor 82 | 5 mmf. |
| Resistor 81 | 560,000 ohms |
| Resistor 85 | 150,000 ohms |
| Capacitor 103 | 0.01 mfd. |
| Resistor 104 | 22,000 ohms |
| Resistor 105 | 120,000 ohms |
| Resistor 170 | 1000 ohms |
| Capacitor 84 | 2000 mmf. |
| Capacitor 106 | 390 mmf. |
| Capacitor 163 | 10–160 mmf. |
| Resistor 107 | 1 megohm |
| Resistor 164 | 47 ohms |
| Tube 108 | Type 6BG6G |
| Capacitor 110 | 5 mfd. |
| Resistor 109 | 82 ohms |
| Capacitor 128 | 0.05 mfd. |
| Capacitor 119 | 0.1 mfd. |
| Capacitor 124 | 0.05 mfd. |
| Resistor 121 | 1000 ohms |
| Capacitor 166 | 0.5 mfd. |
| Tube 118 | Type 6W4GT |
| Capacitor 116 | 0.5 mfd. |
| Tube 143 | Half of type 6AL5 |
| Tube 135 | Half of type 12AU7 |
| Resistor 148 | 180 ohms |
| Resistor 147 | 150,000 ohms |
| Resistor 140 | 100,000 ohms |
| Capacitor 138 | 0.015 mfd. |
| Capacitor 150 | 2.5 mmf. |
| Tube 66 | Half of type 12AU7 |
| Resistor 136 | 27,000 ohms |
| Capacitor 137 | 56 mmf. |
| Resistor 155 | 10,000 ohms |
| Capacitor 154 | 0.01 mfd. |
| Capacitors 41, 43 | 5000 mmf. |
| Resistor 42 | 100 ohms |
| Tube 2 | 6AB4 |
| Resistor 180 | 5.6 megohms |
| Resistor 181 | 33,000 ohms |
| Resistor 182 | 270,000 ohms |
| Resistor 7 | 1 megohm |
| Capacitor 183 | 5000 mmf. |
| Resistor 188 | 1000 ohms |
| Capacitor 185 | 1000 mmf. |
| Resistor 186 | 220,000 ohms |

While there has been shown and described what is at present considered to be the preferred embodiment of the present invention, it will be obvious to those skilled in the art that various modifications and substitutions of equivalents may be made without departing from the true scope of the invention as defined by the appended claim. It will, of course, be understood that this invention is also applicable to radio receivers.

I claim:

An automatic gain control system, for use with a television receiver of the type including a gain-controlled video channel having radio frequency and intermediate frequency stages, a video detector and a line-frequency deflection system having a sweep transformer and providing a source of line-frequency pulses, comprising the combination of means keyed by the line-frequency signal output of said detector for rectifying line-frequency pulses to provide a source of negative potential having an amplitude which varies in accordance with said output, said means comprising an auxiliary winding on said transformer and an electron tube, said tube having a cathode-control electrode circuit coupled to said detector and an anode-cathode circuit in series with said auxiliary winding, an anode load circuit comprising a first resistor and a parallel capacitor connected in series with said winding and said cathode, said first resistor and parallel capacitor having a time-constant product of approximately twenty-three lines, a source of positive potential having a positive terminal, a second resistor and third and fourth resistors connected in series and in a direct current path with said terminal and said winding and said anode, a diode coupled between the junction of the second and third resistors and said cathode and having its own anode connected to said junction for holding said junction substantially at ground potential until the output of said detector reaches such a level that said junction goes negative, means for coupling said junction to said radio frequency stage to apply an A. G. C. potential thereto, and means for coupling the junction of said third and fourth resistors to said intermediate frequency stage to apply an A. G. C. potential thereto, the last-named junction being located between the first-mentioned junction and the source of negative potential, whereby a part of the available negative A. G. C. potential is first applied to the I. F. stages alone, and, after an increase in carrier signal level, A. G. C. potentials not affected by said diode are applied to both R. F. and I. F. stages.

HARLAND A. BASS.

REFERENCES CITED

The following references are of record in the file of this patent:

UNITED STATES PATENTS

| Number | Name | Date |
|---|---|---|
| 2,117,664 | Holst | May 17, 1938 |
| 2,159,803 | Klotz | May 23, 1939 |
| 2,164,979 | Wilhelm | July 4, 1939 |
| 2,171,657 | Klotz | Sept. 5, 1939 |
| 2,199,169 | Dome | Apr. 30, 1940 |
| 2,200,049 | Van Loon | May 7, 1940 |
| 2,223,982 | Bedford | Dec. 3, 1940 |
| 2,300,942 | Lewis | Nov. 3, 1942 |
| 2,303,909 | Blumlein | Dec. 1, 1942 |
| 2,307,375 | Blumlein et al. | Jan. 5, 1943 |
| 2,538,519 | Holst | Jan. 16, 1951 |

FOREIGN PATENTS

| Number | Country | Date |
|---|---|---|
| 845,897 | France | Sept. 4, 1939 |
| 873,623 | France | July 15, 1942 |